US008619564B2

(12) United States Patent
Polk et al.

(10) Patent No.: US 8,619,564 B2
(45) Date of Patent: Dec. 31, 2013

(54) SYNCHRONIZED BANDWIDTH RESERVATIONS FOR REAL-TIME COMMUNICATIONS

(75) Inventors: James M. Polk, Colleyville, TX (US); Subhasri Dhesikan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 446 days.

(21) Appl. No.: 12/938,106

(22) Filed: Nov. 2, 2010

(65) Prior Publication Data

US 2012/0106326 A1    May 3, 2012

(51) Int. Cl.
*H04L 12/26*    (2006.01)

(52) U.S. Cl.
USPC .......................... 370/230; 370/522; 709/229

(58) Field of Classification Search
USPC ................. 370/230, 235, 250, 329, 335, 522; 709/204, 224
See application file for complete search history.

(56) References Cited

U.S. PATENT DOCUMENTS

| 5,596,576 | A  | * | 1/1997 | Milito ............................ 370/450 |
| 6,366,577 | B1 |   | 4/2002 | Donovan |
| 6,522,628 | B1 | * | 2/2003 | Patel et al. ................. 370/230.1 |
| 7,277,455 | B2 |   | 10/2007 | Hus |
| 7,418,476 | B2 | * | 8/2008 | Salesky et al. ................ 709/204 |
| 7,532,613 | B1 |   | 5/2009 | Sen et al. |
| 7,571,238 | B1 |   | 8/2009 | Reeves |
| 7,623,492 | B2 |   | 11/2009 | Yang |
| 7,626,950 | B2 |   | 12/2009 | Wright |
| 8,311,052 | B2 | * | 11/2012 | Nakamura et al. ............ 370/412 |
| 2002/0051434 | A1 | * | 5/2002 | Ozluturk et al. ............... 370/335 |
| 2003/0016630 | A1 | * | 1/2003 | Vega-Garcia et al. ......... 370/252 |
| 2003/0112829 | A1 | * | 6/2003 | Sridhar .......................... 370/522 |
| 2004/0101125 | A1 | * | 5/2004 | Graf et al. ..................... 379/229 |
| 2004/0193709 | A1 | * | 9/2004 | Selvaggi et al. .............. 709/224 |
| 2004/0258016 | A1 | * | 12/2004 | Schmidt et al. ............... 370/329 |
| 2005/0237952 | A1 | * | 10/2005 | Punj et al. ..................... 370/260 |
| 2008/0049630 | A1 | * | 2/2008 | Kozisek et al. ............... 370/250 |
| 2008/0298245 | A1 | * | 12/2008 | Onbeck ...................... 370/235.1 |

FOREIGN PATENT DOCUMENTS

| EP | 1 248 431 | 10/2002 |
| WO | WO 2004/112335 | 12/2004 |
| WO | WO 2007/047479 | 4/2007 |

OTHER PUBLICATIONS

"Notification of Transmittal of the International Search Report and the Written Opinion of the International Searching Authority, or the Declaration", PCT/US2011/055548; dated Feb. 27, 2012, 13 pages.
James Polk, et al., Integrated Services (IntServ) Extension to Allow Signaling of Multiple Traffic Specifications and Multiple Flow Specifications in RSVPv1, IETF, Oct. 25, 2010, 24 pages.

(Continued)

*Primary Examiner* — Min Jung
(74) *Attorney, Agent, or Firm* — Baker Botts L.L.P.

(57) ABSTRACT

A method of initiating a communication session includes transmitting, using a call signaling protocol, a call invitation from a first node over a network for receipt by a second node. The call invitation comprises a list of one or more codecs available to the first node for use when transmitting data over a network. The call invitation additionally comprises a traffic specification associated with each of the one or more codecs. The traffic specification associated with each of the one or mode codecs comprises a plurality of bandwidth attributes that describe the flow of data when transmitting data using each of the one or more codecs.

24 Claims, 7 Drawing Sheets

(56) References Cited

OTHER PUBLICATIONS

H. Schulzrinne, et al., RTP: A Transport Protocol for Real-Time Applications, Request for Comments 1889, Category: Standards Track, Jan. 1996, 67 pages.

R. Braden, et al., Resource Reservation Protocol (RSVP)—Version 1 Functional Specification, Request for Comments 2205, Category: Standards Track, Sep. 1997, 100 pages.

J. Wroclawski, The Use of RSVP with IETF Integrated Services, Request for Comments 2210, Category: Standards Track, Sep. 1997, 30 pages.

S. Shenker, et al., Specification of Guaranteed Quality of Service, Request for Comments 2212, Category: Standards Track, Sep. 1997, 18 pages.

G. Camarillo, et al., Integration of Resource Management and Session Initiation Protocol (SIP), Request for Comments 3312, Category: Standards Track, Oct. 2002, 27 pages.

H. Schulzrinne, et al., RTP: A Transport Protocol for Real-Time Applications, Request for Comments 3550, Category: Standards Track, Jul. 2003, 93 pages.

H. Schulzrinne, et al., RTP Profile for Audio and Video Conferences with Minimal Control, Request for Comments 3551, Category: Standards Track, Jul. 2003, 40 pages.

S. Wenger, et al., RTP: Payload Format for H.264 Video, Request for Comments 3984, Category: Standards Tract, Feb. 2005, 74 pages.

M. Handley, et al., SDP: Session Description Protocol, Request for Comments 4566, Category: Standards Track, Jul. 2006, 44 pages.

J. Polk, et al., Quality of Service (Qos) Mechanism Selection in the Session Description Protocol (SDP), Request for Comments 5432, Category: Standards Track, Mar. 2009, 9 pages.

* cited by examiner

SYNCHRONIZED BANDWIDTH RESERVATIONS FOR REAL-TIME COMMUNICATIONS

TECHNICAL FIELD OF THE DISCLOSURE

The present disclosure relates generally to real-time communications, and more particularly to a method and system for initiating a communication session using synchronized bandwidth reservations.

BACKGROUND OF THE DISCLOSURE

There are many different audio and video codecs that support multiple different quality levels and/or resolutions for real-time communications. For example, an audio codec of G.729 transmits data at 40 kbps, while an HD quality H.264 codec needs upwards of 22 Mbps to properly transmit data. Because of this, different codecs have may have different bandwidth requirements. Before initiating a communication session between two or more endpoints, a codec must be chosen for use in transmitting data between the endpoints. The chosen codec, and the corresponding bandwidth requirements, must be agreed upon by the endpoints as well as any intermediate nodes involved in the communication session.

When initiating a communication session, call signaling is used to negotiate and establish the communication session, and resource reservation is used to reserve the appropriate network resources. One example of a call signaling protocol is the Session Initiation Protocol (SIP), which may also utilize the Session Description Protocol (SDP) to provide a selection of codecs. SDP provides a single bandwidth attribute for each codec when offering a selection of codecs. Examples of resource reservation protocols include the Resource Reservation Protocol (RSVP) and Next Steps in Signaling protocol (NSIS). RSVP is used to reserve the network resources that are required to establish the communication session, and RSVP uses a plurality of bandwidth attributes when reserving resources.

BRIEF DESCRIPTION OF THE DRAWINGS

A more complete understanding of particular embodiments of the disclosure will be apparent from the detailed description taken in conjunction with the accompanying drawings, in which.

DETAILED DESCRIPTION OF EXAMPLE EMBODIMENTS

Overview

The teachings of the present disclosure relate to a method of initiating a communication session. The method includes transmitting, using a call signaling protocol, a call invitation from a first node over a network for receipt by a second node. The call invitation comprises a list of one or more codecs available to the first node for use when transmitting data over a network. The call invitation additionally comprises a traffic specification associated with each of the one or more codecs. The traffic specification associated with each of the one or mode codecs comprises a plurality of bandwidth attributes that describe the flow of data when transmitting data using each of the one or more codecs.

The present disclosure also relates to a method of receiving a request to initiate a communication session. The method includes receiving, using a call signaling protocol, a call invitation comprising a first list of one or more codecs and a traffic specification associated with each of the one or more codecs. The method further includes determining, for each codec, whether the codec is available to a second node for transmitting data over a network. The method additionally includes transmitting, using a call signaling protocol, a response to the call invitation comprising a second list of one or more codecs. The second list indicates which codecs from the first list are available to the second node for transmitting data over a network.

DESCRIPTION OF EXAMPLE EMBODIMENTS

Figure 1:
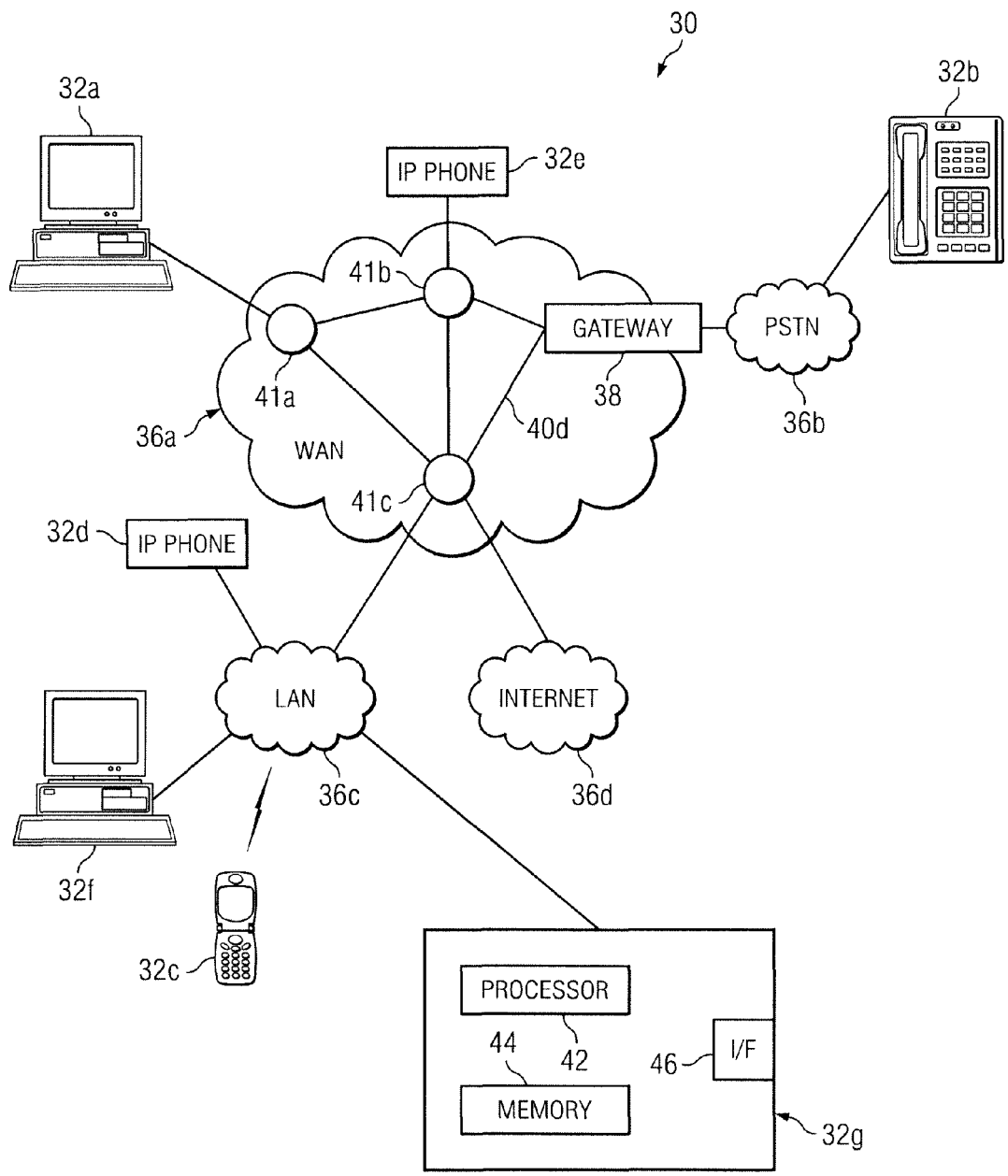
FIG. 1 illustrates a diagram of a network configured to initiate communication sessions using synchronized bandwidth reservations, in accordance with particular embodiments.

FIG. 1 illustrates a diagram of a communications network configured to initiate real-time communication sessions using synchronized bandwidth reservations, in accordance with particular embodiments. Communications network 30 includes a plurality of endpoints 32a-32g having the ability to establish communication sessions between each other through one or more networks 36. Each of the networks 36 may include one or more nodes through which a communication session may pass.

A communication session may include the sending or receiving of communications that comprise any type of media transmitted using any audio, video, and/or data means, including signals, data or messages transmitted through any suitable technology, such as voice devices, text chat, web sessions, streaming media (e.g., streaming video), downloadable media, real-time communications, facsimile, on-line gaming, instant messaging and e-mail. The media of a communication session may be transmitted using one of a plurality of available codecs. A codec may be an algorithm, computer program, or hardware device, or any combination thereof, capable of encoding and decoding the media that is transmitted during a communication session. Individual codecs may provide varying levels of media quality and may require different amounts of bandwidth for media to properly be transmitted using each individual codec.

The media of a communication session may be routed through one or more nodes of one or more networks 36a-36d. In order to avoid bottlenecks when establishing a communication session, the endpoints 32 and all intermediate nodes 41 involved in establishing a communication session may choose a codec having bandwidth attributes that are satisfactory to the endpoints 32 and intermediate nodes 41 involved in initiating the communication session.

In the illustrated embodiment, communication network 30 includes a mix of different types and sizes of networks 36. For example, network 36a is a wide area network (WAN) that enables signaling and communication sessions between a plurality of endpoints 32 and/or nodes 41. WAN 36a may be distributed across multiple cities and geographic regions, and may be referred to as a metro area network (MAN). Network 36b is a public switched telephone network (PSTN) and couples endpoint 32b with WAN 36a through gateway 38. Communication network 36c is a local area network (LAN) that couples endpoints 32c, 32d, 32f, and 32g with network 36a. Accordingly, users of endpoints 32a-32g may establish communication sessions between and among each network component coupled for communication with one or more of networks 36a-36d.

Each of networks 36 include a plurality of nodes 41 that couple together endpoints 32, nodes 41, and other networks 36 (for simplicity, only nodes 41 of network 36a are depicted). This may allow for the establishment of a communication session between any of endpoints 32. In addition to establishing communication sessions, endpoints 32a-32g and nodes 41 may communicate control and data signals among each other.

Although the illustrated embodiment includes four networks 36a-36d, the term "network" should be interpreted as generally defining any interconnection of components capable of transmitting audio and/or video communication signals, data, and/or messages, including signals, data or messages transmitted through text chat, instant messaging and e-mail. Any one of networks 36a-36d may be implemented as a local area network (LAN), wide area network (WAN), global distributed network (e.g., the Internet), Intranet, Extranet, or any other form of wireless or wireline communication network. In addition, networks 36, in accordance with various embodiments, may include any number of endpoints 32 or nodes 41.

In addition to being coupled to other IP networks, network 36a may also be coupled to non-IP communication networks through the use of interfaces and/or components such as gateway 38. In the illustrated embodiment, network 36a is coupled to PSTN 36b through gateway 38. PSTN 36b may include switching stations, central offices, mobile telephone switching offices, pager switching offices, remote terminals, and other related communications equipment that are located throughout the world.

In particular embodiments, one or more of networks may employ media communication protocols that allow for the addressing or identification of endpoints and/or, nodes coupled thereto. For example, using Internet protocol (IP), each of the components coupled together by network 36a may be identified in information directed using IP addresses. In this manner, network 36a may support any form and/or combination of point-to-point, multicast, unicast, or other techniques for exchanging media packets among components in communication network 30.

Depending on the embodiment, one or more of endpoints 32 and/or nodes 41 may include IP telephony or IP video conferencing capabilities allowing them to participate in and/or facilitate multimedia communication sessions. IP telephony or video conferencing devices may include telephones, videophones, fax machines, computers running telephony or video conferencing software, nodes, gateways, wired or wireless devices, hand held PDAs, video cameras, or any other device capable of performing telephony or video conferencing functions over an IP network.

Nodes 41 may include any combination of network components, session border controllers, gatekeepers, call managers, conference bridges, routers, hubs, switches, gateways, endpoints, edgepoints, or any other hardware, encoded software, or embedded logic implementing any number of communication protocols that allow for the exchange of packets in communication network 30. Network domains 36b-36d may comprise components similar to those of network 36a. Any network components capable of exchanging audio, video, or other data using frames or packets are included within the scope of particular embodiments. Other endpoints may include similar components.

Endpoints 32 may comprise processor 42, memory 44, and interface 46; similarly nodes 41a-41d may comprise similar components. For simplicity, only the components of endpoint 32g are depicted. These components are described in more detail below.

Processor 42 of endpoint 32g may be a microprocessor, controller, application specific integrated circuit (ASIC), field-programmable gate array (FPGA), or any other suitable computing device, resource, or combination of hardware with encoded software or embedded logic operable to provide, either alone or in conjunction with other endpoint 32g components (e.g., memory 44 and/or interface 46), endpoint functionality. Such functionality may include establishing a communication session with one or more other endpoints 32.

Memory 44 of endpoint 32g may be any form of volatile or non-volatile memory including, without limitation, magnetic media, optical media, random access memory (RAM), read-only memory (ROM), erasable programmable ROM (EPROM), electrically erasable programmable ROM (EEPROM), removable media, flash memory, or any other suitable local or remote memory component or non-transitory computer readable medium. Memory 44 may store any suitable data or information, including encoded software, or embedded logic, utilized by endpoint 32g and/or processor 42. For example, memory 44 may store a table, list, or other organization of data describing the codecs, resolutions, quality levels, and bandwidths supported by endpoint 32g.

In particular embodiments, functionality described herein may be performed by processor 42 in conjunction with memory 44. In some embodiments, logic embodied in memory 44, such as any non-transitory computer readable medium, when executed by a processor, is operable to perform the functionality described herein.

Interface 46 of endpoint 32g may comprise any hardware combined with any encoded software, or embedded logic needed to be able to send and receive information with other components of communication network 36c. Interface 46 may, for example, transmit a reservation request generated by processor 42. Depending on the embodiment, interface 46 may provide any wired or wireless connection and support any wired or wireless protocol necessary to allow endpoint 32g to communicate with the other components of communication network 36c.

It will be recognized by those of ordinary skill in the art that endpoints 32 and nodes 41 may be any combination of hardware, encoded software, or embedded logic that provides communication services to a user. For example, endpoints 32a-32g may include a telephone, a computer running telephony or multi-media software, a media server, a video monitor, a camera, an IP phone, a cell phone or any other communication hardware, encoded software, or embedded logic running on a computer that supports the communication of packets of media (or frames) using networks 36. Endpoints 32a-32g may also include unattended or automated systems, gateways, other intermediate components or other devices that can establish communication sessions. Although FIG. 1 illustrates a particular number and configuration of endpoints, segments, nodes, and gateways, communication network 30 contemplates any number or arrangement of such components for communicating media. In addition, elements of communication network 30 may include components centrally located (local) with respect to one another or distributed throughout communication network 30.

In particular embodiments, a communication session is initiated using call signaling and in many cases resource reservation. Call signaling may be an application-layer (layer 7) process used to negotiate and establish a communication session between two or more endpoints. Source endpoints send call signaling messages through a signaling network to the destination endpoint. The path of nodes from the source endpoint to the destination endpoint traveled by call signaling messages may be referred to as the call signaling path. Call signaling may be implemented using any appropriate protocol, for example the Session Initiation Protocol (SIP) or the Real-Time Streaming Protocol (RTSP). Resource reservation may be a network-layer (layer 3) process used to reserve the resources across a network that are necessary to transmit data between two or more endpoints. Resource reservation may be implemented using a protocol such as the Resource Reservation Protocol (RSVP). The path of nodes from the source endpoint to the destination endpoint that form the resources may be referred to as the resource path. The call signaling path and the resource path do not have to be, and often are not, the same path between the source and destination endpoints. Depending on the configuration of networks 36a-36d and all intermediate routers and nodes 41, one path may be used for call signaling messages and another path may be used for resource reservation and data transmission.

SIP is an application-layer control protocol that includes primitives for establishing, modifying, and terminating communication sessions. SIP works independently of underlying transport protocols and without dependency on the type of session that is being established. RSVP is a network-layer control protocol that reserves the network resources necessary to deliver specific levels of quality of service. Any other protocols or methods for establishing a communication session and reserving resources for a communication session are included within the scope of particular embodiments.

When initiating a communication session, the source endpoint may offer a selection of codecs that may be used for transmitting data during the communication session. For each offered codec, the source endpoint may include corresponding bandwidth attributes to allow informed decisions regarding which offered codec to choose. For example, SIP may use the Session Description Protocol (SDP) to communicate one or more media codecs when initiating a communication session. SDP may also include a single bandwidth attribute for each codec. The destination endpoint then chooses a codec from the selection of codecs it was offered. If more than one codec is offered to the destination endpoint, more than one codec can be chosen in the answer; but the codec choice is from the list provided in the original offer. Because each codec requires a particular amount of bandwidth, the destination endpoint essentially chooses how much bandwidth will be required by the communication session. Resource reservation protocols may also communicate bandwidth information when reserving resources for a communication session. However, many resource reservation protocols, such as RSVP, often include a plurality of bandwidth attributes as opposed to the singular bandwidth attribute provided by call signaling protocols such as SIP.

Call signaling and resource reservation protocols such as SIP and RSVP can work together to ensure the bandwidth for a reservation is available before establishing a communication session between the source and destination endpoints. However, there is currently a lack of synchronization regarding bandwidth reservations with respect to the nodes in the call signaling path and the nodes in the resource path. This is because call signaling occurs at layer 7 and resource reservation occurs at layer 3 and also because resource reservation utilizes multiple bandwidth attributes while call signaling provides a single bandwidth attribute per codec.

Because bandwidth is often described using a plurality of attributes, such as average rate, peak rate, and burst rate, the singular bandwidth attribute communicated during call signaling (i.e., using SIP/SDP) is often insufficient to describe the flow of data when transmitting data using a particular codec. Thus, in particular embodiments, instead of merely including a single bandwidth attribute for each codec, a plurality of bandwidth attributes for each offered codec are included by the call signaling protocol. Additionally, the nodes in the call signaling path and the resource path are synchronized with respect to the codecs and corresponding bandwidth attributes that are satisfactory to the nodes in the call signaling and resource paths.

In some embodiments, transcoding is used. Transcoding is direct digital-digital conversion of one encoding to another. It is often used in cases where the destination endpoint, or another node, does not support a particular codec. When using transcoding in conjunction with particular embodiments, the communication session is treated has having two call legs. There is one call leg between the source endpoint and the transcoder and another call leg between the transcoder and the destination endpoint. Thus, for each call leg, a separate codec is used and negotiated.

Figure 2:
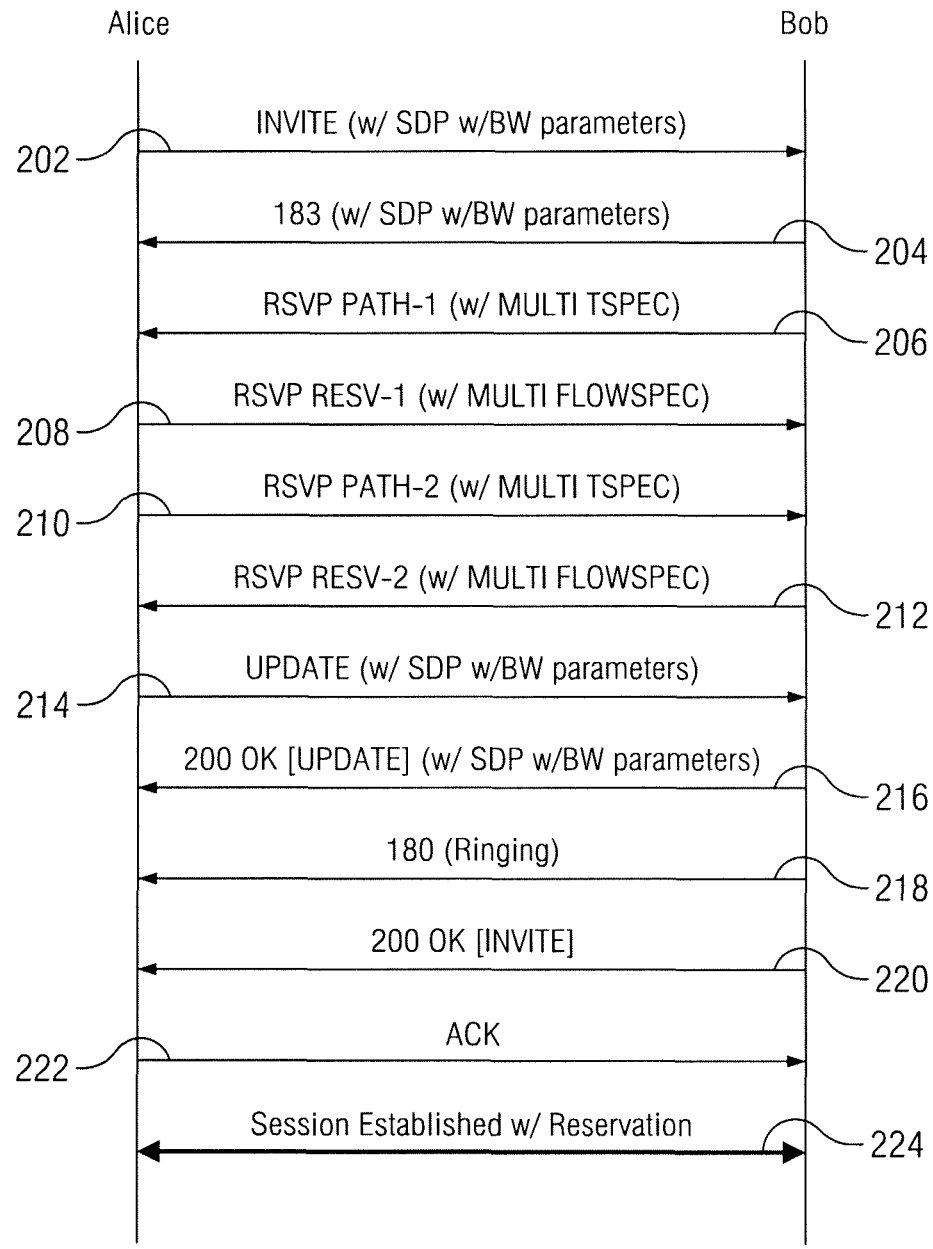
FIG. 2 illustrates the message flow between two endpoints, in accordance with particular embodiments.

FIG. 2 illustrates a message flow between two endpoints, in accordance with particular embodiments. Specifically, FIG. 2 illustrates the initiation of a communication session using the Session Initiation Protocol (SIP) in conjunction with the Session Description Protocol (SDP) for call signaling and the Resource Reservation Protocol (RSVP) for resource reservation. The illustrated message flow is exchanged between Alice and Bob, where Alice represents a source endpoint and Bob represents a destination endpoint. The Alice and Bob endpoints may be similar to endpoints 32 described with respect to FIG. 1. The process begins at step 202 where Alice sends a call invitation using SIP/SDP to Bob. The call invitation is sent through the call signaling path between Alice and Bob. For simplicity, the following message flow diagram omits intermediate network nodes. Thus, the call signaling path is not illustrated. The call invitation contains a list of codecs that Alice is offering to Bob, and for each codec in the list, a corresponding traffic specification (TSPEC). A TPSEC is a plurality of bandwidth attributes that describe the flow of data when transmitting data using a particular codec. In some embodiments, a request specification (RPSEC) corresponding to each codec is also included. An RSPEC is a plurality of bandwidth attributes that describe the required amount of bandwidth needed to transmit data using a particular codec. When call invite 202 is traversing the call signaling path to Bob, the intermediate nodes in the call signaling path may prune a codec from the codec list if they cannot or choose not to support it. Thus, the list of codecs received by Bob may not include all the codecs in the original call invite sent by Alice in step 202.

At step 204, Bob sends a call response to Alice in the form of an SIP 183 session progress message, as defined by SIP. An SIP 183 session progress message is used to convey information about the progress of the call. The call response is sent through the call signaling path between Bob and Alice and is transmitted using the call signaling protocol used by Alice (i.e., SIP in conjunction with SDP). Bob's call response will also includes a codec list similar to the list from the call invite that Bob received from Alice. As discussed above, the list Bob receives from Alice is the original list sent by Alice unless one or more of the codecs are pruned by intermediate network nodes. If Bob decides he cannot or does not want to support any of the codecs in the list received in the call invite, he may prune any such codecs from the list. For example, although Bob may be able to support a particular codec, Bob may choose a codec that requires less bandwidth because he wants to keep bandwidth available for other communication sessions. Bob's call response will include the codecs in the list he received from Alice, minus any codecs that Bob has decided to prune from the list.

At step 206, Bob sends a RSVP PATH message through the network to Alice to reserve network resources for the communication session between Bob and Alice. The RSVP PATH message is sent through a path of network resources, called the resource path, from Bob to Alice. Depending on the configuration of the network, the resource path and the call signaling path are often different paths. Bob's RSVP PATH message contains a list of one or more TSPECs and RSPECs associated with the codecs from Alice's call invite that Bob has decided not to prune. In some embodiments, Bob may choose to prune codecs in his 183 Response at step 204, but not to prune the corresponding TSPECs and RSPECs when sending his RSVP PATH message at step 206. Bob may also choose to indicate a preference for one or more TSPECs and RSPECs in the RSVP PATH message. As the RSVP PATH message traverses the resource path, each resource node in the resource path may choose to prune one or more TSPECs and RSPECs if the resource node cannot grant resources for the particular TSPEC and corresponding RSPEC in the list.

At step 208, Alice then responds with an RSVP RESV message. This message travels in reverse through the same path traveled by the RSVP PATH message. Pruning of TSPECs and RSPECs may also occur when the RSVP RESV message is traveling to Bob. When Bob receives this message from Alice, all network resources in the resource path have analyzed the list of TSPECs and corresponding RSPECs and pruned those that cannot be granted sufficient network resources. Thus, sufficient resources are available and reserved for the remaining TSPECs and corresponding RSPECs on the list. At step 210, Alice now sends an RSVP PATH message to Bob, and at step 212 Bob responds with an RSVP RESV message back to Alice. These steps are the same as steps 206 and 208, except the resources in the resource path are being reserved for Alice to transmit data to Bob. At this point, all nodes in the call signaling and resource paths have pruned any unsatisfactory codecs and/or unsatisfactory TSPECs and RSPECs. These paths are often different, and the list of pruned codecs in the call signaling path may not be synchronized with the list of pruned TSPECs and RSPECs in the resource reservation path. For example, if there was no pruning done by the nodes in the call signaling path but there was pruning done by the nodes in the resource path, the nodes in the call signaling path will not be aware of the pruning. Thus, it may be necessary to send an update to the nodes in the call signaling path to synchronize those nodes with the nodes in the resource path.

At step 214, Alice sends an update through the call signaling path from Alice to Bob. At step 216, Bob responds with a SIP 200 OK message to inform Alice that the update has succeeded. A 200 OK message as defined by SIP is a message that informs the recipient that a particular request has succeeded. The update messages include the list of codecs associated with the TSPECs and RSPECs that have not been pruned by the resource nodes in the resource path. At this point, the nodes in the call signaling path are synchronized with the nodes in the resource path. At step 218 Bob sends a 180 ringing message, as defined by SIP, to alert Alice that Bob is ready to establish a communication session. At step 220, Bob sends a SIP 200 OK message to inform Alice that her initial call invite from step 202 has now succeeded. At step 222 Alice sends an ACK message to acknowledge Bob's indication that Alice's request to initiate a communication session has succeeded. Finally, at step 224, a communication session is established between Alice and Bob.

Figure 3:
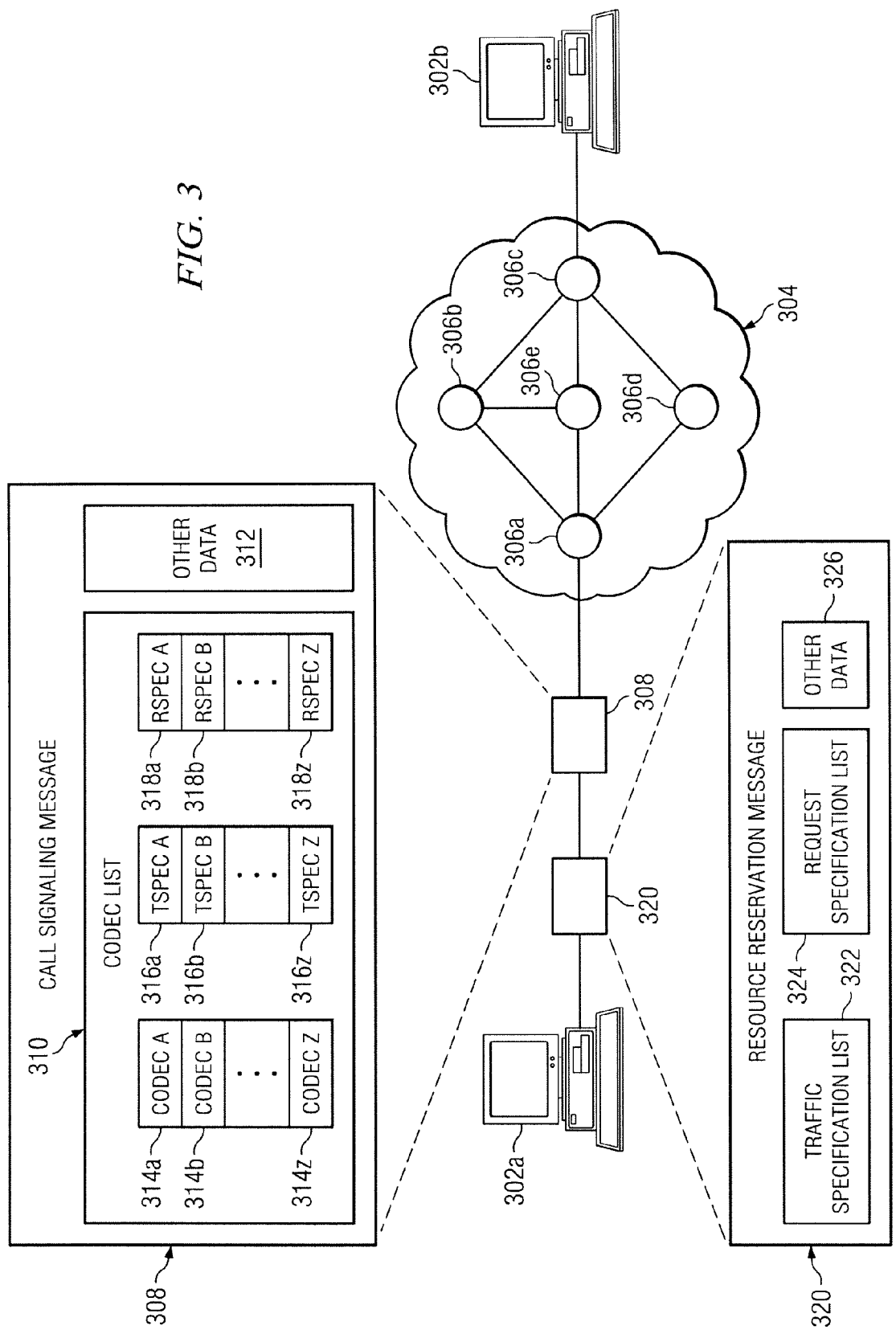
FIG. 3 illustrates a diagram of a call signaling message and a resource reservation message sent when initiating a communication session using synchronized bandwidth reservations, in accordance with particular embodiments.

FIG. 3 illustrates a diagram of a network initiating a communication session using synchronized bandwidth reservations, in accordance with particular embodiments. The diagram of FIG. 3 depicts network 304, intermediate nodes 306a-306e of network 304, source endpoint 202a, and destination endpoint 202b. Call signaling message 308 and resource reservation message 320 are being transmitted from source endpoint 302a to destination endpoint 302b. Call signaling message 208 traverses a series of intermediate nodes 306 in network 304 to reach destination endpoint 302b. The path of intermediate nodes 306 traversed from source endpoint 302a to destination endpoint 302b is the call signaling path from source endpoint 302a to destination endpoint 302b. Similarly, resource reservation message 320 traverses a series of intermediate nodes 306 to reach destination endpoint 302a. This path of intermediate nodes is the path of network resources used for transmitting data, also known as the resource path. The configuration of network 304 and intermediate nodes 306 will dictate the various paths taken. Often, the call signaling path and the resource path will not be the same. For example, in the illustrated embodiment, call signaling message 308 may be transmitted from source endpoint 302a through nodes 306a, 306b, and 306c before reaching destination endpoint 302b. On the other hand, resource reservation message 320 may be transmitted from source endpoint 302a through nodes 306a, 306e, and 306c before reaching destination endpoint 302b. Depending on the configuration of the network, there may be any number of possible call signaling paths and resource paths.

Call signaling message 308 may be sent using any appropriate call signaling protocol (i.e., SIP) and may be any type of call signaling message, such as an invite, response, or update. Call signaling message 308 includes codec list 310 and additionally includes other data 312. Codec list 310 comprises a list of codecs 314a-314z that are available to source endpoint 302a for transmitting data during the communication session. Corresponding to codecs 314a-314z are traffic specifications (TSPECs) 316a-316z and request specifications (RSPECs) 318a-318z. A TSPEC generally contains bandwidth attributes that describe the flow of traffic when data is transmitted using a particular codec. An RSPEC generally contains bandwidth attributes that specify the bandwidth requirements for transmitting data using a particular codec. Details regarding the contents of a TSPEC and RSPEC are discussed in detail with respect to FIG. 4. If a node in the call signaling path does not support or cannot grant the bandwidth for a particular codec, that node prunes the codec from the list of codecs offered. The bandwidth attributes specified by the TSPECs 316 and RSPECs 318 help the nodes in the call signaling path and resource path make informed decisions about whether they can support a particular codec or guarantee sufficient resources for a particular codec. In some embodiments, the codec list may only include a TSPEC corresponding to each codec. In other embodiments, both a TSPEC and an RSPEC may be included for each codec.

Resource reservation message 320 may be sent using any resource reservation protocol, such as RSVP. Resource reservation message 320 contains traffic specification (TSPEC) list 322, request specification (RSPEC) list 324, and other data 326. TSPEC list 322 contains a list of one or more traffic specifications, and RSPEC list 324 contains a list of one more request specifications associated with the traffic specifications from TSPEC list 322.

Figure 4:
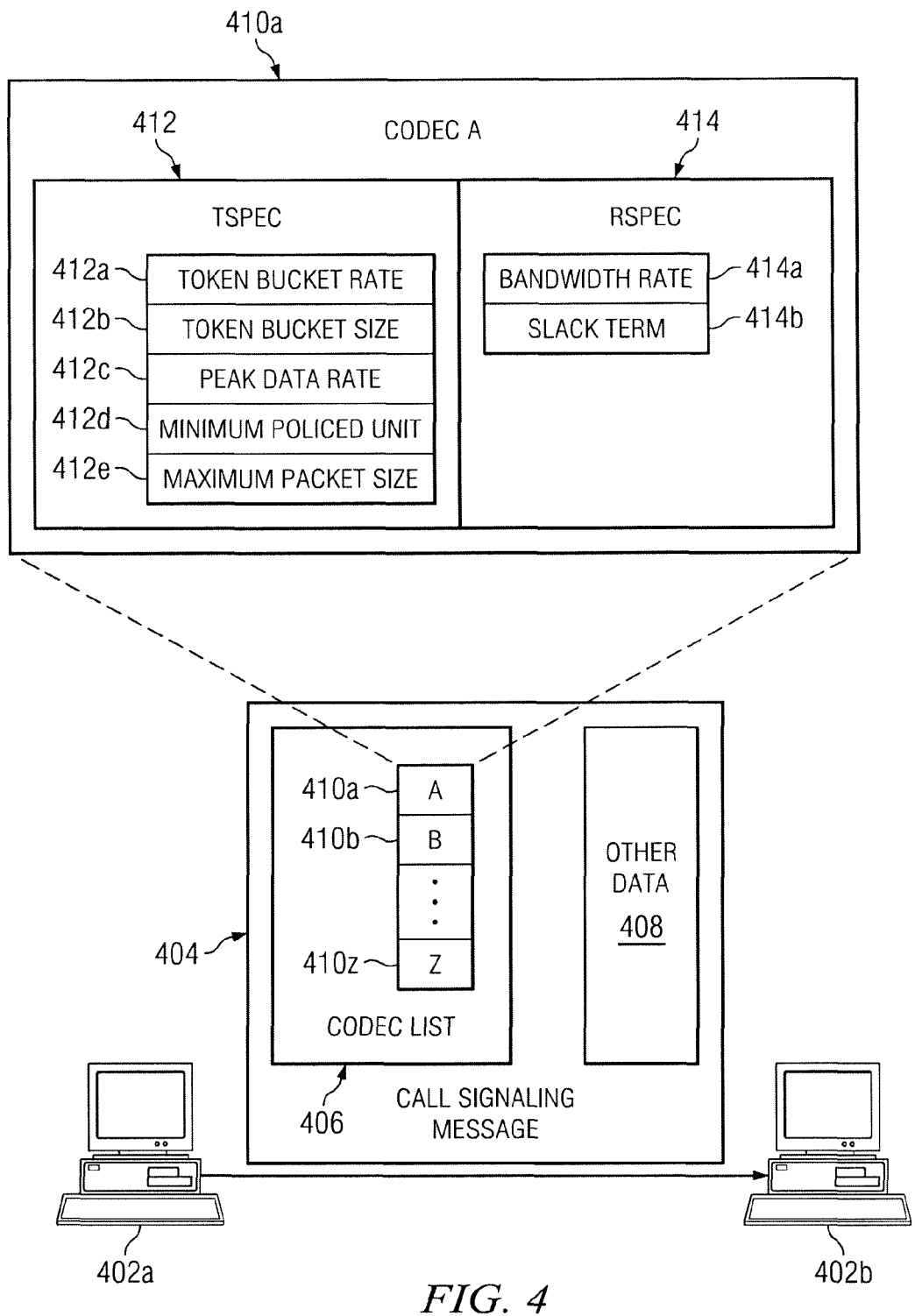
FIG. 4 illustrates a diagram of a traffic specification and a request specification from a call signaling message, in accordance with particular embodiments.

FIG. 4 illustrates a diagram of a traffic specification (TSPEC) and a request specification (RSPEC) from a call signaling message, in accordance with particular embodiments. More specifically, call signaling message 404 is being transmitted by endpoint 402a to endpoint 402b. Call signaling message 404 includes codec list 406 and other data 408. Codec list 406 includes a list of codecs 410a-410z. The details of codec A 410a from codec list 406 are depicted in further detail. The details of codecs B-Z 410b-z are omitted for simplicity. Specifically, the entry for codec A 410a includes TSPEC 412 and RSPEC 414.

TSPEC 412 contains five bandwidth attributes 412a-412e. Specifically, TSPEC 412 contains token bucket rate 412a, token bucket size 412b, peak data rate 412c, minimum policed unit 412d, and maximum packet size 412e. Token bucket rate 412a and token bucket size 412b make up a token bucket specification, which is a control mechanism that dictates when traffic can be injected into the network based on the presence of tokens in a token bucket. Token bucket rate 412a specifies a rate at which an abstract token is inserted into the token bucket. Token bucket rate 412a is generally specified in terms of kilobits per second, but may be measured in any suitable manner. Tokens are inserted into the token bucket at the token bucket rate 412a. Tokens in the bucket are removed, or cashed in, when a packet is sent. If there are no tokens in the bucket, no packets are allowed to be transmitted. Additionally, no new tokens may be added to the token bucket when the bucket is full. The token bucket is full when the number of tokens in the bucket is equal to the token bucket size 412b. The token bucket can become full when tokens are added to the bucket at a rate faster than the rate at which packets are being injected into the network.

To further illustrate how the token bucket rate 412a and token bucket size 412b are used, consider the following example. Assume token bucket rate 412a is 100 kilobits of IP datagrams per second, and token bucket size 412b is 10 tokens. If an IP packet with a size of 500 kilobits needs to be injected into the network, there must be at least five tokens in the token bucket or the packet cannot be injected into the network. In this manner, the burst rate of injecting packets into the network is limited by the token bucket rate and token bucket size.

Peak data rate 412c is generally measured according to the same units as token bucket rate 412a, i.e., kilobits per second. Peak data rate 412c specifies the maximum rate at which bursts of traffic may be injected into the network. Contrasted with token bucket rate 412a and token bucket size 412b, peak data rate 412c specifies the maximum rate that packets may be injected into the network, whereas token bucket rate 412a and token bucket size 412b dictate the burst rate that packets are allowed to be injected into the network.

Minimum policed unit 412d is generally measured in bytes. When determining if an IP packet conforms to the TSPEC (i.e., determining if there are sufficient tokens in the token bucket to send the packet), if the size of the IP packet is less than the minimum policed unit, then the IP packet will be treated as though its size is equal to minimum policed unit 412d. In this manner, a minimum packet size is set and packets of a smaller size will be treated as though they are of the minimum size specified by minimum policed unit 412d.

Maximum packet size 412e is the largest sized IP packet that will conform to the TSPEC and is also generally measured in bytes. All packets injected into the network cannot be greater than maximum packet size 412e.

As an example, a codec that required a 1 Mbps average rate reservation with a 1.5 Mpbs peak rate would have a token bucket rate of 1500 kilobits and a peak data rate of 3000 kilobits.

RSPEC 414 contains two bandwidth attributes, bandwidth rate 414a and slack term 414b. Bandwidth rate 414a is generally measured in IP datagrams per second, and slack term 414b is generally measured in microseconds. Bandwidth rate 414a is essentially a request for a reservation of bandwidth at the specified rate. Bandwidth rate 414a can be bigger than peak data rate 414c from the TSPEC because a higher rate will reduce queuing delay. Slack term 414b signifies the difference between the desired delay and the delay obtained by using bandwidth rate 414a. When a call signaling message or resource reservation message is being transmitted through the nodes of a network, if a node cannot guarantee bandwidth rate 414a, it may use slack term 414b to reduce bandwidth rate 414a by an appropriate amount such that the node is able to grant the request for the reduced bandwidth rate 414a. The Resource Reservation Protocol (RSVP) uses the bandwidth attributes from TSPEC 412 and RSPEC 414 discussed above.

TSPEC 412 and RSPEC 414 may be transmitted in call signaling message 404 in any suitable manner. In some embodiments, the Session Description Protocol (SDP) may be extended to include functionality to transmit the bandwidth attributes from TSPEC 412 and RSPEC 414 in an SIP call signaling message. SDP is a format for describing streaming media initialization parameters in an ASCII string, and in some embodiments SDP may be used in conjunction with another call signaling protocol such as SIP or RTSP. In other embodiments SDP may be used in a standalone format. SDP describes a session using a series of parameters and values, one per line. Each parameter name is a single character, followed by an '=', and then a value. The media parameter, 'm', is used describe the type of media session. The format of a media parameter string is: m=<media><port><protocol><format>. For example, the media parameter string "m=video 51472 RTP/AVP <format>" describes a video session on port 51472 using transport protocol RTP/AVP. The <format> field varies based on the protocol. For the protocol RTP/AVP, the format field will specify a list RTP payload type numbers, the first being the default.

An attribute parameter string, denoted in SDP by the letter 'a', is sent for each codec that is to be offered. Each attribute parameter string specifies the bandwidth parameters from TSPEC 412 and RSPEC 414 for the particular codec specified in the string. The bandwidth parameters can be specified in any suitable manner. For example, consider the following attribute string: a=rtpmap:<codec> reservation r b p m M (R S). The "rtpmap" field specifies that an RTP payload type number should be mapped to the media encoding scheme specified by the <codec> field. The <codec> field represents a number corresponding to the codec being offered. For example, the number 1 corresponds to the G.711 codec, thus "a=rtpmap:1" would be the beginning of the attribute parameter for the G.711 codec. Other codecs are identified by different numbers. For example the G.729 codec is identified by the number 18, the H.261 codec is identified by the number 31, and the H.263 codec is identified by the number 34. The "reservation" portion of the attribute string specifies that information regarding bandwidth reservation is being provided.

In some embodiments, the bandwidth parameters are specified using raw numbering in an SDP attribute string. For example, in the attribute parameter string discussed above, "a=rtpmap:<codec> reservation r b p m M (R S)," the letters "r b p m M (R S)" represent the individual bandwidth attribute values from TSPEC 412 and RSPEC 414. These values are specified as 0 or greater, and are identified based on the order they appear. The first five letters represent the five attribute parameters from TSPEC 412. The first letter 'r' represents token bucket rate 412a, 'b' represents token bucket size 412b, 'p' represents peak data rate 412c, m represents minimum policed unit 412d, and 'M' represents maximum packet size 412e. The final two letters represent the bandwidth attributes from RSPEC 414, where 'R' represents bandwidth rate 414a and 'S' represents slack term 414b. In some embodiments, bandwidth rate 414a and slack term 414b may not be specified in the attribute string, as some embodiments only specify bandwidth attributes corresponding to TSPEC 412.

In some embodiments, when using SDP to describe bandwidth attributes from TSPEC 412 and RSPEC 414, an SDP media parameter string is transmitted first to describe the type of media session. Then, an attribute parameter string is sent for each codec that is to be offered. For example, consider the following:

m=video 51472 RTP/AVP X Y Z
a=rtpmap:1 reservation rbpmM (R S)
a=rtpmap:18 reservation r b p m M (R S)

As discussed above, the media string provides information regarding the type of media session, and the attribute strings provide information regarding the codecs and their corresponding TSPEC and RSPEC bandwidth attributes. In this particular example, attribute strings for the G.711 codec (identified by the number 1) and G.729 codec (identified by the number 18) have been provided. The actual numerical values for the TSPEC and RSPEC bandwidth attributes have been omitted, but are represented by the letters r, b, p, m, M, R, and S, as discussed above.

In other embodiments, the bandwidth attributes from TSPEC 412 and RSPEC 414 may be specified in an SDP attribute string by labeling each relevant bandwidth attribute. For example, "a=rtpmap:<codec> reservation Token-Bucket-Rate=r; Token-Bucket-Size=b; Peak-Data-Rate=p; Minimum-Policed-Unit=m; Maximum-Policed-Unit=M" is an example of an SDP attribute string where each bandwidth attribute from TSPEC 412 and RSPEC 414 is identified by a label rather than by raw numbering. By labeling the bandwidth attributes, if a particular bandwidth attribute does not need to be specified, then that bandwidth attribute can be omitted. Contrasted to the raw numbering format described above, the labeling format can omit unnecessary attributes, whereas the raw numbering format must at least specify an unnecessary attribute as '0'. Raw numbering and labeling are merely two examples of how to extend the functionality of SDP to convey the bandwidth attributes from TSPEC 412 and RSPEC 414, however any suitable manner of conveying these bandwidth attributes falls within the scope of the present disclosure.

Resource reservation messages also include TPSECs and RSPECs containing the same information discussed above with respect to TSPEC 412 and RSPEC 414 from call signaling message 404. Resource reservation messages, however, generally do not identify the codec corresponding to each TSPEC and RSPEC.

Figure 5:
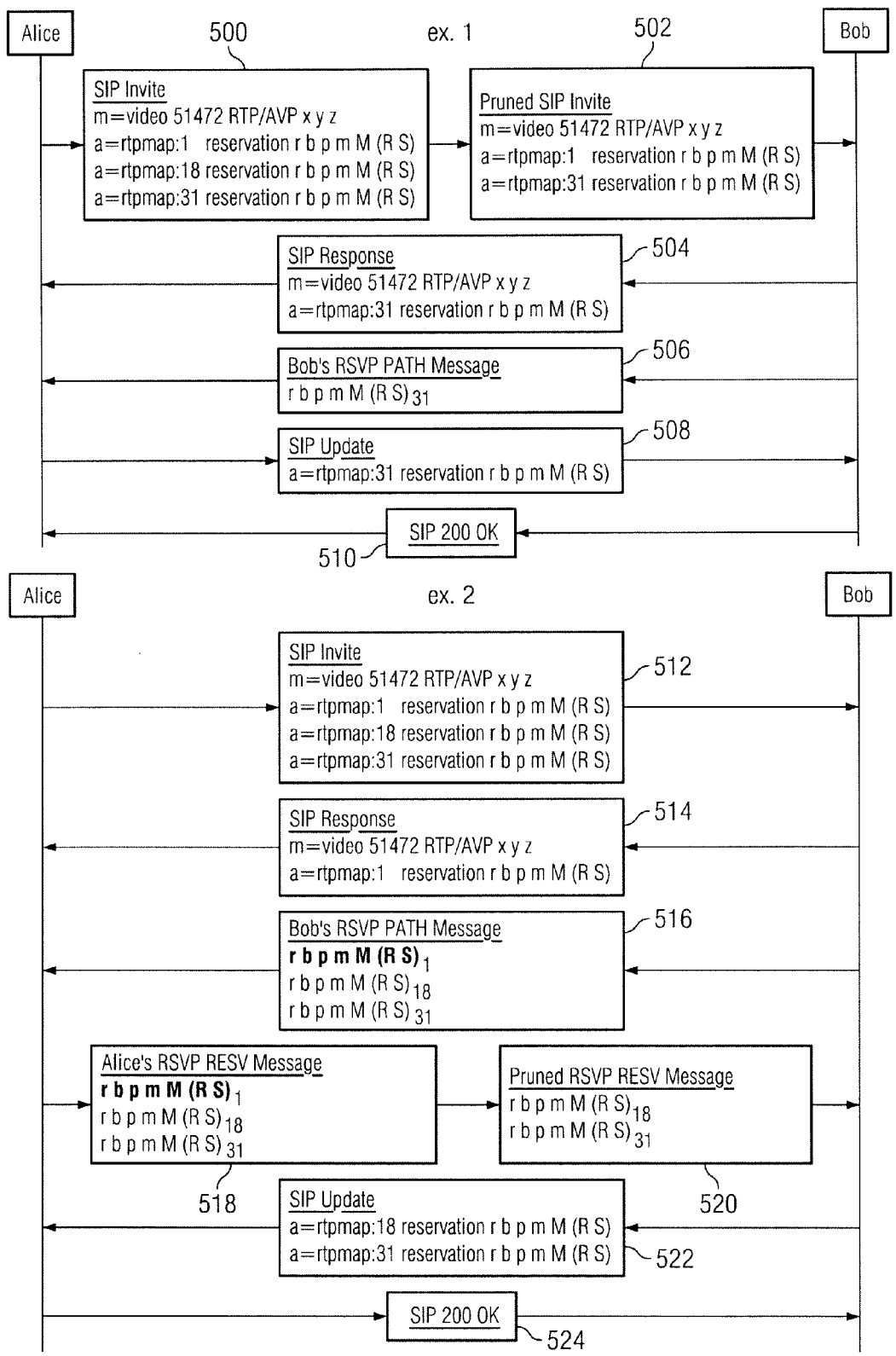
FIG. 5 illustrates two examples of initiating a communication session using SIP in conjunction with SDP and RSVP, in accordance with particular embodiments.

FIG. 5 illustrates two examples of initiating a communication session using SIP in conjunction with SDP and RSVP, in accordance with particular embodiments. In examples 1 and 2, the communication session is being initiated between Alice and Bob, where Alice represents the source endpoint and Bob represents the destination endpoint. Specifically, example 1 of FIG. 5 illustrates a call initiation between Alice and Bob, where the list of codecs gets pruned at layer 7 (i.e., by a node in the call signaling path between Alice and Bob). At step 500 Alice sends a call invite to Bob using SIP, including three codecs to choose from. During transmission to Bob, the list of codecs get pruned at step 502 by a node in the call signaling path from Alice to Bob. Specifically, a node in the call signaling path determined that it did not want to use the G.729 codec (corresponding to the number 18 in the SIP attribute string). The pruned invite is what Bob receives. At step 504, Bob determines that he does not want the G.711 codec (corresponding to the number 1 in the SIP attribute string), and so Bob prunes this codec from the list and then sends his SIP response to the call invite, which consists of the only remaining codec that has not been pruned. Bob sends an RSVP PATH message at step 506 containing the traffic specification and request specification corresponding to the only codec remaining from Bob's SIP response at step 504. Alice receives Bob's SIP response and Bob's RSVP PATH message and notices that Bob's RSVP PATH message does not contain all of the traffic specifications and request specifications associated with the codecs from Alice's call invite at step 500. Thus, Alice sends an SIP update at step 508 to notify the nodes in the call signaling path from Alice to Bob of the updated list of codecs corresponding to the traffic specifications and request specifications from Bob's RSVP PATH message. In this case, Bob included only the traffic specification and request specification corresponding to the H.261 codec, represented by the number 31. Thus, Alice's SIP update includes only this codec. Bob receives this update and sends an SIP 200 OK message at step 510. At this point, the nodes in the call signaling path from Alice to Bob have been updated and are synchronized with the nodes in the resource path.

Example 2 of FIG. 5 illustrates an initiation of a communication session between Alice and Bob where the pruning occurs at layer 3 (i.e., by a node in the path of network resources from Alice to Bob or Bob To Alice). At step 512, Alice sends a call invite to BOB using SIP, including three codecs to choose from. At step 514, Bob determines that he can support all three codecs, but he has a preference for codec 1. Thus, Bob sends an SIP response, pruning two codecs and only including the one codec that he prefers. At step 516, Bob sends his RSVP PATH message including the traffic specifications and request specifications corresponding to all three original codecs, but indicating a preference for the traffic specification and request specification corresponding to the one codec he included in his SIP response at step 514. Alice sends an RSVP RESV message at 518 with the same traffic specifications and request specifications as in Bob's RSVP PATH message, thus indicating that she can support all of them. At step 520, the traffic specification and request specification corresponding to the G.711 codec (represented by the number 1) from the RSVP RESV message gets pruned by one of the nodes in the resource path. This traffic specification and request specification corresponds to the only codec that Bob included in his SIP response at step 514 (i.e., the codec Bob prefers). Thus, at step 522, Bob sends an SIP update to Alice to update the nodes in the call signaling path from Bob to Alice of the list of codecs whose corresponding traffic specifications and request specifications have not been pruned by the nodes in the resource reservation path. Alice responds at step 524 with an SIP 200 OK response. At this point, the nodes in the call signaling path are synchronized with the nodes in the resource reservation path, and all of the nodes are aware of the codecs and/or corresponding traffic and request specifications available to the other nodes for transmitting data during the communication session.

In example 2, if the list of traffic specifications and corresponding request specifications would have been pruned during transmission from Bob to Alice rather than from Alice to Bob (i.e., if the list was pruned in the RSVP PATH message instead of the RSVP RESV message), then as in example 1, Alice would send the SIP update because she would realize that the RSVP PATH message did not contain the traffic specification and request specification associated with the only codec that Alice received in Bob's SIP response at step 514. Current implementations of SIP and RSVP support this updating behavior by Alice. However, there is no mechanism for Bob to update if Bob determines that one of the resource nodes has pruned a traffic specification and request specification. Therefore, in this particular embodiment, the only scenario where an additional message must be sent is when a traffic specification and corresponding request specification is pruned by one of the resource nodes in the resource path from Alice to Bob. In all other scenarios, there are no additional messages that need to be exchanged between Alice and Bob.

Figure 6:
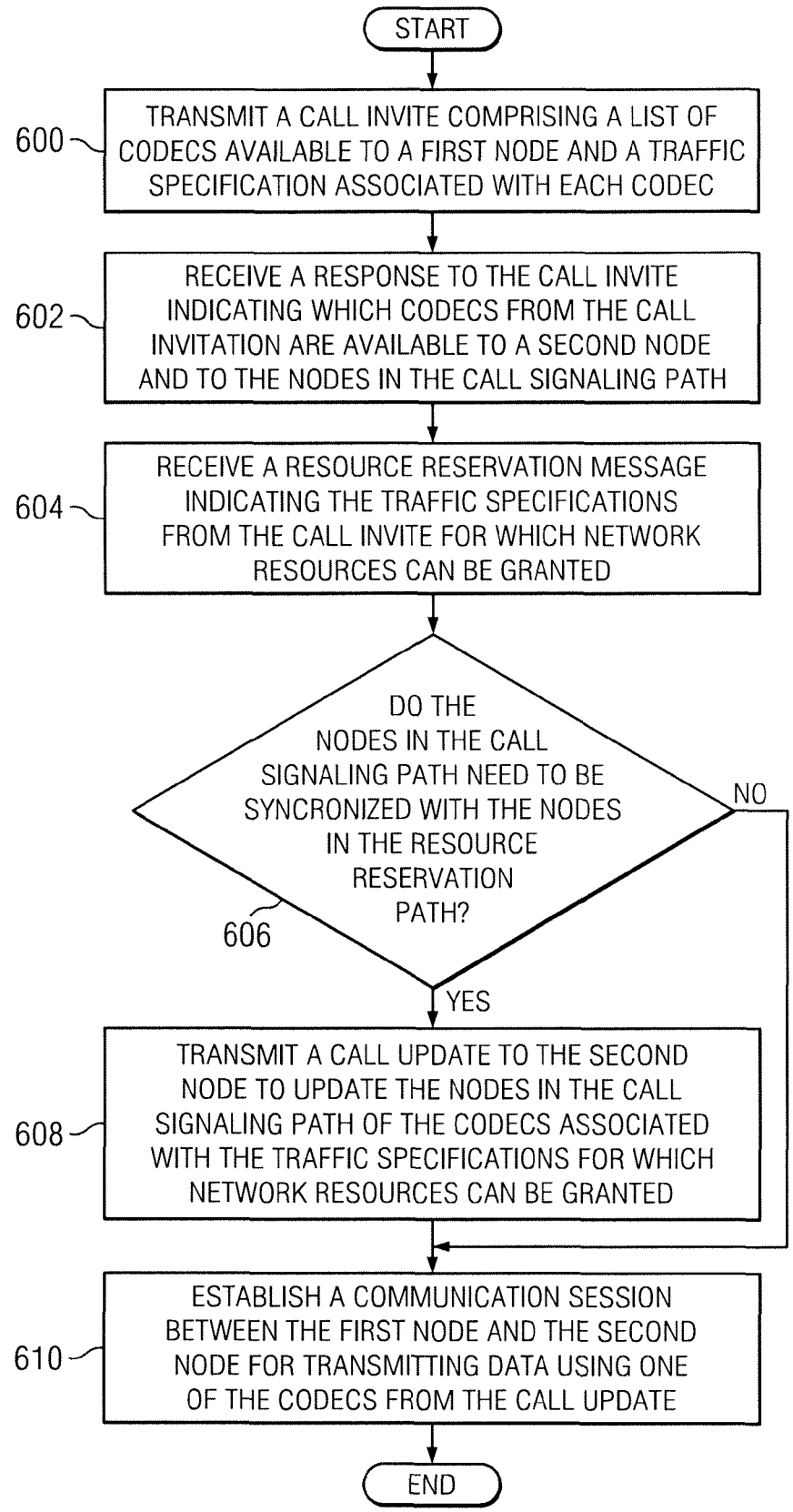
FIG. 6 illustrates a method for initiating a communication session using synchronized bandwidth reservations, in accordance with particular embodiments.

FIG. 6 illustrates a method for initiating a communication session using synchronized bandwidth reservations, in accordance with particular embodiments. In the particular embodiment depicted by FIG. 6, the steps are being performed by a source endpoint, such as endpoint 202*a* discussed above with respect to FIG. 2. The method begins at step 600 where a call invite is transmitted from a first node through a network to a second node. In some embodiments, the call invite is transmitted using a call signaling protocol such as SIP in conjunction with SDP. The call invite comprises a list of codecs that may be used for transmitting data during the communication session, as well as a TSPEC associated with each codec. At step 602, a response to the call invite is received from the second node. The response indicates the codecs offered in the call invite that are supported by or acceptable to the second node and also to the nodes in the call signaling path. In some embodiments, the response is a 183 session progress response, as defined by SIP. At step 604, a resource reservation message is received. The resource reservation message indicates the TSPECs from the call invite that have not been pruned by the resource nodes in the path of network resources. When the resource reservation message is being transmitted, if an intermediate resource node in the path of network resources cannot grant or chooses not to grant sufficient resources to support a TSPEC, that node prunes the TSPEC from the resource reservation message. In some embodiments, the resource reservation message is an RSVP PATH message sent using the Resource Reservation Protocol (RSVP).

At step 606, it is determined if the nodes in the call signaling path need to be synchronized with the nodes in the resource reservation path. The nodes need to be synchronized when a TSPEC was pruned by a node in the resource reservation path, but the codec corresponding to that TSPEC was not pruned by the nodes in the call signaling path. If the nodes do not need to be synchronized, then control proceeds to step 610 where the communication session is established between the first node and the second node. If the nodes do need to be synchronized, then control proceeds to step 608. At step 608, a call update is sent through the call signaling path to the second node. The update contains the list of codecs associated with the TSPECs that were not pruned by the resource nodes. The purpose of the update is to synchronize the nodes in the call signaling path with the nodes in the resource reservation path. In some embodiments, the update is sent using a call signaling protocol such as SIP. After the update is sent, control proceeds to step 610 where the communication session is established between the first node and the second node.

Figure 7:
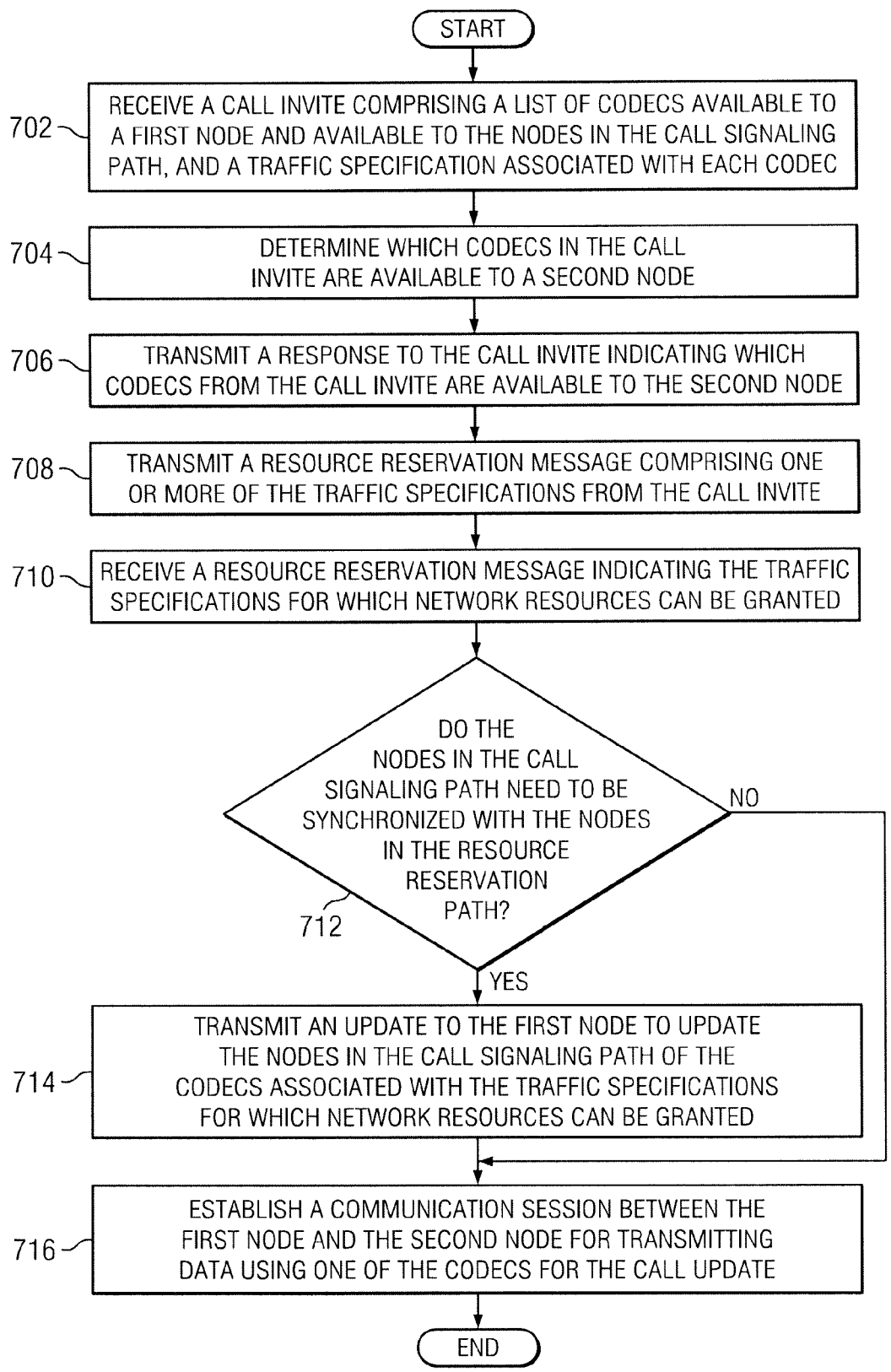
FIG. 7 illustrates a method for responding to a request for a real-time communication session using synchronized bandwidth reservations, in accordance with particular embodiments.

FIG. 7 illustrates a method for responding to a request for a communication session using synchronized bandwidth reservations, in accordance with particular embodiments. In the particular embodiment depicted by FIG. 7, the steps are being performed by a destination endpoint. At step 702, a call invite is received from a first node. The call invitation contains a list of codecs and a corresponding TSPEC for each codec. In some embodiments, the call invite is sent using a call signaling protocol such as SIP in conjunction with SDP. Although the call invitation was sent by a first node, if any intermediate network nodes in the call signaling path between the first node and the second node do not support or do not prefer any of the listed codecs, the codecs will be pruned from the list before forwarding the call invite to the next network node. In this manner, when the call invite reaches the second node, only codecs that are supported by the first node and all intermediate network nodes in the call signaling path from the first node to the second node are contained in the call invite.

At step 704, a determination is made regarding which codecs contained in the call invite are supported by or acceptable to the second node. At step 706, a response to the call invite is transmitted from the second node to the first node through the call signaling path between the two nodes. The response contains a list of codecs that were determined in step 704 to be supported by or acceptable to the second node. In some embodiments, the response is a 183 session progress response, as defined by SIP. At step 708, a resource reservation message is sent from the second node to the first node through the path of network resources from the second node to the first node. In some embodiments, the resource reservation message is an RSVP PATH message sent using RSVP. Generally, the resource reservation message contains the TSPECs associated with the codecs from the response to the call invite from step 706. However, all the TSPECs associated with the original list of codecs from the call invite in step 702, or only a subset of those TSPECs, may be transmitted in the resource reservation message. In some embodiments, if the list of TSPECs in the resource reservation message contains additional TSPECs that are not found in the response to the call invite, the resource reservation message may indicate a preference for one or more TSPECs that are in both the response to the call invite and the resource reservation message. At step 710, a resource reservation message from the first node is received. In some embodiments, the resource reservation message is an RSVP RESV message sent using RSVP. The resource reservation message contains a list of TSPECs available to the first node and intermediate resource nodes in the resource path between the first node and the second node. The resource reservation message from step 710 will contain the same list of TSPECs as the resource reservation message from step 708 unless one or more TPSECs were pruned by the intermediate network resources.

At step 712, it is determined whether the nodes in the call signaling path need to be synchronized with the nodes in the resource reservation path. The nodes need to be synchronized when a TSPEC was pruned by a node in the resource reservation path, but the codec corresponding to that TSPEC was not pruned by any of the nodes in the call signaling path. If the nodes in the call signaling path do not need to be synchronized with the nodes in the resource reservation path, control proceeds to step 716 where the communication session is established between the first node and the second node. If the nodes in the call signaling path do need to be synchronized with the nodes in the resource reservation path, then control proceeds to step 714.

At step 714, a call update is transmitted from the second node to the first node through the call signaling path. The purpose of the update is to synchronize the nodes in the call signaling path with the nodes in the resource reservation path with respect to traffic specifications that have been pruned by the resource nodes in the path of network resources. In some embodiments, the update is sent using SIP. After the update is sent, control proceeds to step 716 where the communication session is established between the first node and the second node.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A method comprising:
transmitting, using a call signaling protocol, a call invitation from a first node over a network for receipt by a second node, the call invitation comprising a first codec list comprising:
a list of one or more codecs available to the first node for transmitting data over a network;
a traffic specification associated with each of the one or more codecs, the traffic specification comprising a plurality of bandwidth attributes for each of the one or more codecs, wherein the plurality of bandwidth attributes describe the flow of data when transmitting data using each of the one or more codecs; and
receiving, before establishing a communication session, a resource reservation message comprising one or more traffic specifications from the first codec list, the resource reservation message indicating that network resources for the one or more traffic specifications can be granted.

2. The method of claim 1, further comprising:
establishing the communication session for transmitting data between the first node and the second node using a codec selected from the first codec list.

3. The method of claim 1, further comprising:
updating a plurality of nodes in a call signaling path from the first node to the second node of the one or more traffic specifications for which network resources can be granted; and
establishing the communication session for transmitting data between the first node and the second node using a codec associated with one of the one or more traffic specifications for which network resources can be granted.

4. The method of claim 1, wherein the traffic specification associated with each of the one or more codecs comprises at least one of the following bandwidth attributes:
a token bucket specification to control the burst rate at which a particular number of packets will be inserted into the network for transmission;
a peak data rate indicating a maximum rate at which packets can be inserted into the network for transmission;

a minimum policed unit indicating a minimum packet size; or
a maximum packet size indicating the maximum size of a packet used to transmit data over the network.

5. The method of claim 4, wherein the token bucket specification comprises:
a token bucket rate indicating a rate at which a token is added to a token bucket; and
a token bucket size indicating a maximum number of tokens allowed in the token bucket at any given time.

6. The method of claim 1, wherein the first codec list further comprises a request specification associated with each of the one or more codecs comprising:
a bandwidth rate indicating a requested rate of data transmission; and
a slack term indicating the difference between a desired delay and a delay obtained when using the bandwidth rate.

7. A method comprising:
receiving, using a call signaling protocol, a call invitation comprising a first codec list comprising:
a list of one or more codecs available to a first node for use when transmitting data over a network; and
a traffic specification associated with each of the one or more codecs, the traffic specification comprising a plurality of bandwidth attributes for each of the one or more codecs, wherein the plurality of bandwidth attributes describe the flow of data when transmitting data using each of the one or more codecs; and
transmitting, before establishing a communication session, a resource reservation message comprising one or more traffic specifications from the first codec list, the resource reservation message indicating that network resources for the one or more traffic specifications can be granted.

8. The method of claim 7, further comprising:
determining, for each codec in the first codec list, whether the codec is available for transmitting data over a network; and
transmitting, using a call signaling protocol, a response to the call invitation comprising a second codec list, the second codec list indicating which codecs from the first codec list are available for transmitting data over a network.

9. The method of claim 8, further comprising:
transmitting from a second node a first resource reservation message comprising a first traffic specification list, the first traffic specification list comprising one or more of the traffic specifications associated with the codecs from the first codec list;
receiving a second resource reservation message comprising a second traffic specification list, the second traffic specification list indicating the one or more traffic specifications from the first traffic specification list for which network resources can be granted; and
updating a plurality of nodes in a call signaling path from the first node to the second node of the one or more traffic specifications for which network resources can be granted.

10. The method of claim 7, wherein the traffic specification associated with each of the one or more codecs comprises at least one of the following bandwidth attributes:
a token bucket specification to control the burst rate at which a particular number of packets will be inserted into the network for transmission;
a peak data rate indicating a maximum rate at which data can be inserted into the network for transmission;

a minimum policed unit indicating a minimum packet size; or a maximum packet size indicating the maximum size of a packet used to transmit data over the network.

11. The method of claim 7, wherein the first codec list further comprises a request specification associated with each of the one or more codecs comprising:

a bandwidth rate indicating a requested rate of data transmission; and a slack term indicating the difference between a desired delay and a delay obtained when using the bandwidth rate.

12. A system comprising:

a memory operable to store a call invitation comprising a first codec list comprising:

a list of one or more codecs available to a first node for transmitting data over a network; and a traffic specification associated with each of the one or more codecs, the traffic specification comprising a plurality of bandwidth attributes for each of the one or more codecs, wherein the plurality of bandwidth attributes describe the flow of data when transmitting data using each of the one or more codecs; and a processor operable to:

transmit, using a call signaling protocol, the call invitation from the first node over a network for receipt by a second node; and receive, before establishing a communication session, a resource reservation message comprising one or more traffic specifications from the first codec list, the resource reservation message indicating that network resources for the one or more traffic specifications can be granted.

13. The system of claim 12, wherein the processor is further operable to establish the communication session for transmitting data between the first node and the second node using a codec selected from the first codec list.

14. The system of claim 12, wherein the processor is further operable to:

update a plurality of nodes in a call signaling path from the first node to the second node of the one or more traffic specifications for which network resources can be granted; and establish the communication session for transmitting data between the first node and the second node using a codec associated with one of the one or more traffic specifications for which network resources can be granted.

15. The system of claim 12, wherein the traffic specification associated with each of the one or more codecs comprises at least one of the following bandwidth attributes:

a token bucket specification to control the burst rate at which a particular number of packets will be inserted into the network for transmission;

a peak data rate indicating a maximum rate at which packets can be inserted into the network for transmission;

a minimum policed unit indicating a minimum packet size; or a maximum packet size indicating the maximum size of a packet used to transmit data over the network.

16. The system of claim 15, wherein the token bucket specification comprises:

a token bucket rate indicating a rate at which a token is added to a token bucket; and a token bucket size indicating a maximum number of tokens allowed in the token bucket at any given time.

17. The system of claim 12, wherein the first codec list further comprises a request specification associated with each of the one or more codecs comprising:

a bandwidth rate indicating a requested rate of data transmission; and a slack term indicating the difference between a desired delay and a delay obtained when using the bandwidth rate.

18. A system comprising:

a processor operable to:

receive, using a call signaling protocol, a call invitation comprising a first codec list comprising:

a list of one or more codecs available to a first node for use when transmitting data over a network; and a traffic specification associated with each of the one or more codecs, the traffic specification comprising a plurality of bandwidth attributes for each of the one or more codecs, wherein the plurality of bandwidth attributes describe the flow of data when transmitting data using each of the one or more codecs; and transmit, before establishing a communication session, a resource reservation message comprising one or more traffic specifications from the first codec list, the resource reservation message indicating that network resources for the one or more traffic specifications can be granted; and a memory operable to store the call invitation.

19. The system of claim 18, wherein the processor is further operable to:

determine, for each codec in the first codec list, whether the codec is available for transmitting data over a network; and transmit, using a call signaling protocol, a response to the call invitation comprising a second codec list, the second codec list indicating which codecs from the first codec list are available for transmitting data over a network.

20. The system of claim 18, wherein the traffic specification associated with each of the one or more codecs comprises at least one of the following bandwidth attributes:

a token bucket specification to control the burst rate at which a particular number of packets will be inserted into the network for transmission a peak data rate indicating a maximum rate at which data can be inserted into the network for transmission;

a minimum policed unit indicating a minimum packet size; or a maximum packet size indicating the maximum size of a packet used to transmit data over the network.

21. The system of claim 18, wherein the first codec list further comprises a request specification associated with each of the one or more codecs comprising:

a bandwidth rate indicating a requested rate of data transmission; and a slack term indicating the difference between a desired delay and a delay obtained when using the bandwidth rate.

22. The system of claim 18, wherein the processor is further operable to:

transmit from a second node a first resource reservation message comprising a first traffic specification list, the first traffic specification list comprising one or more of the traffic specifications associated with the codecs from the first codec list;

receive a second resource reservation message comprising a second traffic specification list, the second traffic specification list indicating the one or more traffic specifications from the first traffic specification list for which network resources can be granted; and update a plurality of nodes in a call signaling path from the first node to the second node of the one or more traffic specifications for which network resources can be granted.

23. Logic embodied in a non-transitory computer readable medium, the computer readable medium comprising code, when executed by a processor, operable to:

transmit, using a call signaling protocol, a call invitation from a first node over a network for receipt by a second node, the call invitation comprising a first codec list comprising:
- a list of one or more codecs available to the first node for transmitting data over a network; and
- a traffic specification associated with each of the one or more codecs, the traffic specification comprising a plurality of bandwidth attributes for each of the one or more codecs, wherein the plurality of bandwidth attributes describe the flow of data when transmitting data using each of the one or more codecs;

wherein the traffic specification associated with each of the one or more codecs comprises at least one of the following bandwidth attributes:
- a token bucket specification to control the burst rate at which a particular number of packets will be inserted into the network for transmission;
- a peak data rate indicating a maximum rate at which packets can be inserted into the network for transmission;
- a minimum policed unit indicating a minimum packet size; or
- a maximum packet size indicating the maximum size of a packet used to transmit data over the network; and receive, before establishing a communication session, a resource reservation message comprising one or more traffic specifications from the first codec list, the resource reservation message indicating that network resources for the one or more traffic specifications can be granted.

24. A system comprising:

means for transmitting, using a call signaling protocol, a call invitation from a first node over a network for receipt by a second node, the call invitation comprising a first codec list comprising:
- a list of one or more codecs available to the first node for transmitting data over a network; and
- a traffic specification associated with each of the one or more codecs, the traffic specification comprising a plurality of bandwidth attributes for each of the one or more codecs, wherein the plurality of bandwidth attributes describe the flow of data when transmitting data using each of the one or more codecs;

means for receiving, before establishing a communication session, a resource reservation message comprising one or more traffic specifications from the first codec list, the resource reservation message indicating that network resources for the one or more traffic specifications can be granted;

means for updating a plurality of nodes in a call signaling path from the first node to the second node of the one or more traffic specifications for which network resources can be granted;

means for establishing the communication session for transmitting data between the first node and the second node using a codec associated with one of the one or more traffic specifications for which network resources can be granted.

* * * * *